US012410316B2

(12) United States Patent
Maeda et al.

(10) Patent No.: US 12,410,316 B2
(45) Date of Patent: Sep. 9, 2025

(54) URETHANE RESIN COMPOSITION AND LEATHER SHEET

(71) Applicant: DIC Corporation, Tokyo (JP)

(72) Inventors: Ryo Maeda, Osaka (JP); Yayi Tseng, Osaka (JP)

(73) Assignee: DIC Corporation, Tokyo (JP)

( * ) Notice: Subject to any disclaimer, the term of this patent is extended or adjusted under 35 U.S.C. 154(b) by 721 days.

(21) Appl. No.: 17/773,009

(22) PCT Filed: Sep. 10, 2020

(86) PCT No.: PCT/JP2020/034209
§ 371 (c)(1),
(2) Date: Apr. 28, 2022

(87) PCT Pub. No.: WO2021/084921
PCT Pub. Date: May 6, 2021

(65) Prior Publication Data
US 2022/0403164 A1    Dec. 22, 2022

(30) Foreign Application Priority Data

Oct. 28, 2019 (JP) ................................. 2019-195228

(51) Int. Cl.
| | | |
|---|---|---|
| *C08L 75/06* | (2006.01) | |
| *C08G 18/08* | (2006.01) | |
| *C08G 18/12* | (2006.01) | |
| *C08G 18/44* | (2006.01) | |
| *C08G 18/48* | (2006.01) | |
| *C08G 64/02* | (2006.01) | |
| *C08G 65/06* | (2006.01) | |
| *D06N 3/14* | (2006.01) | |

(52) U.S. Cl.
CPC .......... *C08L 75/06* (2013.01); *C08G 18/0823* (2013.01); *C08G 18/12* (2013.01); *C08G 18/44* (2013.01); *C08G 18/485* (2013.01); *C08G 64/0208* (2013.01); *C08G 65/06* (2013.01); *D06N 3/146* (2013.01)

(58) Field of Classification Search
CPC ..... C08L 75/06; C08G 18/0823; C08G 18/12; C08G 18/44; C08G 18/485; C08G 64/0208; C08G 65/06; C08G 18/227; C08G 18/3206; C08G 18/6674; C08G 18/722; C08G 18/755; C08G 18/758; C08G 18/32; D06N 3/146; D06N 2211/28; C08J 2375/06; C08J 5/046; C08J 3/03
See application file for complete search history.

(56) References Cited

U.S. PATENT DOCUMENTS

| | | | |
|---|---|---|---|
| 11,441,033 B2 | 9/2022 | Shikuri et al. | |
| 2008/0090949 A1* | 4/2008 | Nagao | C08G 18/4202 524/401 |
| 2013/0136913 A1* | 5/2013 | Chiyonobu | C08G 18/6659 428/221 |
| 2014/0212676 A1* | 7/2014 | Tetsui | C08G 18/758 156/289 |
| 2016/0208432 A1* | 7/2016 | Tetsui | D06N 3/146 |
| 2018/0037692 A1* | 2/2018 | Kanamori | C08G 63/16 |

FOREIGN PATENT DOCUMENTS

| | | |
|---|---|---|
| CA | 3053737 | 9/2018 |
| CN | 108291000 | 7/2018 |
| EP | 3398980 | 11/2018 |
| EP | 3590986 | 1/2020 |
| JP | 2007119749 | 5/2007 |
| JP | 2017119755 | 7/2017 |
| JP | 2018104486 A * | 7/2018 |
| TW | 201736502 | 10/2017 |
| TW | 201841978 | 12/2018 |
| WO | 2018159359 | 9/2018 |

OTHER PUBLICATIONS

Machine translation of JP 2018-104486 (Year: 2018).*
"International Search Report (Form PCT/ISA/210) of PCT/JP2020/034209", mailed on Dec. 1, 2020, with English translation thereof, pp. 1-4.

* cited by examiner

*Primary Examiner* — Doris L Lee
(74) *Attorney, Agent, or Firm* — JCIPRNET

(57) ABSTRACT

A water-containing urethane resin composition that is produced using a biomass raw material and excellent in oleic acid resistance, texture, and liquid mixture stability. A urethane resin composition including: a urethane resin (A) having an anionic group and a nonionic group and produced using as a raw material a polycarbonate polyol (a1) produced using biomass-derived decanediol as a raw material; a nonionic emulsifier (B); and water (C). A leather sheet in which a coagulated product of the urethane resin composition is present in a fibrous substrate. Both the urethane resin (A) and the nonionic emulsifier (B) preferably have an oxyethylene group and an oxypropylene group.

7 Claims, No Drawings

URETHANE RESIN COMPOSITION AND LEATHER SHEET

CROSS-REFERENCE TO RELATED APPLICATION

This application is a 371 application of the international PCT application serial no. PCT/JP2020/034209, filed on Sep. 10, 2020, which claims the priority benefit of Japan application no. 2019-195228, filed on Oct. 28, 2019. The entirety of each of the above-mentioned patent applications is hereby incorporated by reference herein and made a part of this specification.

TECHNICAL FIELD

The present invention relates to a urethane resin composition and a leather sheet.

BACKGROUND ART

Polyurethane resins have been widely used in the production of synthetic leather (including artificial leather) because of their high mechanical strength and excellent texture. Solvent-based urethane resins containing N,N-dimethylformamide (DMF) have been mainly used for the production of synthetic leather. However, elimination of the usage of DMF in urethane resins for layers constituting synthetic leather has been demanded against the backdrop of, for example, tightening DMF control in Europe, tightening VOC emission control in China and Taiwan, and tightening DMF control in major apparel companies.

To respond to such environment, a urethane resin composition in which a urethane resin is dispersed in water has been broadly studied (for example, see PTL 1). However, in the existing urethane resin compositions including a urethane resin composition described in PTL 1, it was difficult to achieve both excellent texture and liquid mixture stability.

Furthermore, in recent years, against the backdrop of global warming and depletion of petroleum resources, global demand for biomass raw materials, such as plants, has been increasing in order to reduce the amount of usage of fossil resources, such as petroleum.

CITATION LIST

Patent Literature

PTL 1: Japanese Unexamined Patent Application Publication No. 2007-119749

SUMMARY OF INVENTION

Technical Problem

The present invention provides a water-containing urethane resin composition that is produced using a biomass raw material and excellent in oleic acid resistance, texture, and liquid mixture stability.

Solution to Problem

The present invention provides a urethane resin composition including: a urethane resin (A) having an anionic group and a nonionic group and produced using as a raw material a polycarbonate polyol (a1) produced using biomass-derived decanediol as a raw material; a nonionic emulsifier (B); and water (C).

The present invention further provides a leather sheet in which a coagulated product of the above-mentioned urethane resin composition is present in a fibrous substrate.

Advantageous Effects of Invention

A urethane resin composition according to the present invention contains water and furthermore is produced using a biomass-derived raw material, and thus the urethane resin composition is an environment-responsive material. Furthermore, the urethane resin composition is excellent in oleic acid resistance, texture, and liquid mixture stability. Hence, the urethane resin composition can be particularly suitably used as a resin for the impregnation of fibrous substrates.

DESCRIPTION OF EMBODIMENTS

A urethane resin composition according to the present invention includes: a urethane resin (A) having an anionic group and a nonionic group and produced using as a raw material a polycarbonate polyol (a1) produced using biomass-derived decanediol as a raw material; a nonionic emulsifier (B); and water (C).

To achieve excellent oleic acid resistance and texture, the urethane resin (A) used in the present invention is produced essentially using the polycarbonate polyol (a1) produced using biomass-derived decanediol as a raw material. Since the decanediol is a biomass-derived raw material, a more environment-friendly material can be provided. As the polycarbonate polyol (a1), a reaction product of a glycol compound including the biomass-derived decanediol with carbonate and/or phosgene can be used, and specifically, the polycarbonate polyol described in Japanese Unexamined Patent Application Publication No. 2018-127758 or the like can be used.

From the viewpoint of achieving more excellent oleic acid resistance, texture, and low-temperature flexibility, 1,10-decanediol is preferably used as the decanediol.

Examples of a glycol compound that can be used, other than the decanediol, include ethylene glycol, propylene glycol, 1,3-propanediol, 1,4-butanediol, 1,3-butanediol, 1,2-butanediol, 2-methyl-1,3-propanediol, 1,5-pentanediol, neopentyl glycol, 1,6-hexanediol, 1,5-hexanediol, 3-methyl-1,5-pentanediol, 2-methyl-1,8-octanediol, 1,7-heptanediol, 1,8-octanediol, 1,9-nonanediol, 1,8-nonanediol, 2-ethyl-2-butyl-1,3-propanediol, 1,12-dodecanediol, 1,4-cyclohexanedimethanol, 1,3-cyclohexanedimethanol, trimethylolpropane, trimethylolethane, glycerin, and ε-caprolactone. These compounds may be used alone or in combination of two or more. From the viewpoint of achieving more excellent oleic acid resistance, texture, and low-temperature flexibility, of these compounds, butanediol is preferably used, and 1,4-butanediol is more preferably used.

In the case where the biomass-derived decanediol and the butanediol are used in combination, the total amount of the biomass-derived decanediol and the butanediol used in the glycol compound is preferably 50 mol % or more, more preferably 70 mol % or more, and still more preferably 80 mol % or more.

Furthermore, in the case where the biomass-derived decanediol (C10) and the butanediol (C4) are used in combination, the molar ratio [(C4)/(C10)] is preferably within a range of 5/95 to 95/5, more preferably within a range of 50/50 to 98/2, and still more preferably within a range of 70/30 to 95/5, from the viewpoint of achieving more excellent oleic acid resistance and low-temperature flexibility.

Examples of the carbonate that can be used include dimethyl carbonate, diethyl carbonate, diphenyl carbonate, ethylene carbonate, and propylene carbonate. These compounds may be used alone or in combination of two or more.

From the viewpoint of achieving more excellent oleic acid resistance and low-temperature flexibility, the number average molecular weight of the polycarbonate polyol (a1) is preferably within a range of 500 to 100,000, and more preferably within a range of 700 to 5,000. Note that the number average molecular weight of the polycarbonate polyol (a1) is a value determined by gel permeation chromatography (GPC).

Preferable examples of the polycarbonatediol (a1) that are commercially available include "BENEBiOL NL-3010DB" and "BENEBiOL NL-3030DB", manufactured by Mitsubishi Chemical Corporation.

To achieve both excellent texture and liquid mixture stability, the urethane resin (A) essentially has an anionic group and a nonionic group. The anionic group and the nonionic group are supplied from an anionic group-containing compound (a2) and a nonionic group-containing compound (a3), respectively.

Examples of the anionic group-containing compound (a2) that can be used include: carboxyl group-containing compounds, such as 2,2-dimethylolpropionic acid, 2,2-dimethylolbutanoic acid, 2,2-dimethylolbutyric acid, and 2,2'-dimethylolvaleric acid; and sulfonyl group-containing compounds, such as 3,4-diaminobutanesulfonic acid, 3,6-diamino-2-toluenesulfonic acid, 2,6-diaminobenzenesulfonic acid, N-(2-aminoethyl)-2-aminosulfonic acid, N-(2-aminoethyl)-2-aminoethylsulfonic acid, N-2-aminoethane-2-aminosulfonic acid, and N-(2-aminoethyl)-β-alanine, and salts thereof. These compounds may be used alone or in combination of two or more.

Examples of the nonionic group-containing compound (a3) that can be used include compounds having an oxyethylene structure and/or an oxypropylene group, such as polyethylene glycol, polyoxypropylene glycol, polyoxyethylene polyoxypropylene glycol, polyoxyethylene polyoxytetramethylene glycol, and polyethylene glycol monomethyl ether. These compounds may be used alone or in combination of two or more.

From the viewpoints of achieving more excellent texture and liquid mixture stability, the nonionic group contained in the urethane resin (A) used in the present invention preferably includes an oxyethylene group and an oxypropylene group. When these low crystalline components are incorporated into a main chain of the urethane resin (A), more excellent texture and liquid mixture stability can be achieved, and therefore, the oxyethylene group and the oxypropylene group are preferably supplied from a polyol having an oxyethylene group and an oxypropylene group, and more preferably supplied from polyoxyethylene polyoxypropylene glycol.

From the viewpoints of achieving more excellent texture and liquid mixture stability, the number average molecular weight of the polyoxyethylene polyoxypropylene glycol is preferably within a range of 500 to 10,000, and more preferably within a range of 1,000 to 4,000. Note that the number average molecular weight of the polyoxyethylene polyoxypropylene glycol is a value determined by GPC.

From the viewpoints of achieving more excellent texture and liquid mixture stability, the molar ratio (EO/PO) of the oxyethylene group (EO) to the oxypropylene group (PO) in the urethane resin (A) is preferably within a range of 20/80 to 90/10, and more preferably within a range of 40/60 to 85/15.

From the viewpoint of achieving more excellent hydrolysis resistance, textures, and liquid mixture stability, the amount of usage of the nonionic group-containing compound (a3) in the raw materials constituting the urethane resin (A) is preferably within a range of 0.1% by mass to 20% by mass, and more preferably 0.5% by mass to 15% by mass.

Specific examples of the urethane resin (A) that can be used include a reaction product of a polyol including the polycarbonate polyol (a1), the anionic group-containing compound (a2), the nonionic group-containing compound (a3), and polyisocyanate (a4).

As the polyol, other polyols may be used in combination with the polycarbonate polyol (a1), unless advantageous effects of the present invention are impaired. Examples of the other polyols that can be used include: polycarbonate polyols other than the polycarbonate polyol (a1), polyester polyols, polyether polyols, and polyacrylic polyols. These polyols may be used alone or in combination of two or more. The number average molecular weight of these polyols is, for example, within a range of 500 to 100,000. The number average molecular weight of the polyol is a value determined by GPC.

The polyol may be used in combination with a chain extender having a number average molecular weight within a range of 50 to 450, if necessary. Note that the number average molecular weight of the chain extender is a value calculated from a chemical structural formula.

Examples of the chain extender that can be used include: hydroxyl group-containing chain extenders, such as ethylene glycol, diethylene glycol, triethylene glycol, propylene glycol, dipropylene glycol, 1,3-propanediol, 1,3-butanediol, 1,4-butanediol, hexamethylene glycol, saccharose, methylene glycol, glycerin, sorbitol, bisphenol A, 4,4'-dihydroxydiphenyl, and 4,4'-dihydroxydiphenyl ether; and amino group-containing chain extenders, such as ethylenediamine, 1,2-propanediamine, 1,6-hexamethylenediamine, piperazine, 2,5-dimethylpiperazine, isophoronediamine, 1,2-cyclohexanediamine, 1,3-cyclohexanediamine, 1,4-cyclohexanediamine, 4,4'-dicyclohexylmethanediamine, 3,3'-dimethyl-4,4'-dicyclohexylmethanediamine, and hydrazine. These chain extenders may be used alone or in combination of two or more. From the viewpoints of achieving more excellent hydrolysis resistance and light resistance, among these chain extenders, the amino group-containing chain extenders are preferably used. From the viewpoint of achieving more excellent texture, trifunctional or higher functional compounds, such as glycerin and trimethylolpropane, are preferably used.

Examples of the polyisocyanate (a4) that can be used include: aromatic polyisocyanates, such as phenylene diisocyanate, toluene diisocyanate, diphenylmethane diisocyanate, naphthalene diisocyanate, polymethylene polyphenyl polyisocyanate, and carbodiimidated diphenylmethane polyisocyanate; and aliphatic or alicyclic polyisocyanates, such as hexamethylene diisocyanate, lysine diisocyanate, dimer acid diisocyanate, cyclohexane diisocyanate, isophorone diisocyanate, dicyclohexylmethane diisocyanate, xylylene diisocyanate, tetramethylxylylene diisocyanate, and norbornene diisocyanate. These polyisocyanates may be used alone or in combination of two or more. From the viewpoint of achieving more excellent light resistance, among these polyisocyanates, aliphatic polyisocyanates and/ or alicyclic polyisocyanates are preferably used, and alicyclic polyisocyanates are more preferably used.

Examples of a method for producing the urethane resin (A) include a method in which the raw materials are mixed at once and allowed to react. Examples of a method for the reaction include a method in which the reaction is performed at a temperature of 50° C. to 100° C. for 3 hours to 10 hours.

When the urethane resin (A) is produced, an isocyanate group remaining in the urethane resin (A) is preferably deactivated. To deactivate the isocyanate group, an alcohol having a hydroxyl group, such as methanol, is preferably used. The amount of usage of the alcohol, if used, is preferably within a range of 0.001 part by mass to 10 parts by mass, with respect to 100 parts by mass of the urethane resin (A).

When the urethane resin (A) is produced, an organic solvent may be used. Examples of the organic solvent that can be used include: ketone compounds, such as acetone and methyl ethyl ketone; ether compounds, such as tetrahydrofuran and dioxane; acetate compounds, such as ethyl acetate and butyl acetate; nitrile compounds, such as acetonitrile; and amide compounds, such as dimethylformamide and N-methylpyrrolidone. These organic solvents may be used alone or in combination of two or more. Note that the organic solvent is preferably removed in the end, for example, by a distillation method.

From the viewpoints of achieving more excellent hydrolysis resistance, flexibility, and texture, the acid value of the urethane resin (A) is preferably within a range of 0.1 mgKOH/g to 15 mgKOH/g, and more preferably within a range of 1 mgKOH/g to 8 mgKOH/g. The acid value of the urethane resin (A) can be adjusted using the amount of the anionic group-containing compound (a2). A method for measuring the acid value will be described later in Examples.

From the viewpoints of achieving more excellent hydrolysis resistance, light resistance, and heat resistance, the weight-average molecular weight of the urethane resin (A) is preferably within a range of 50,000 to 700,000, and more preferably within a range of 100,000 to 500,000. Note that the weight-average molecular weight of the urethane resin (A) is a value determined by GPC under the following conditions.

The nonionic emulsifier (B) is an essential component for achieving excellent texture and liquid mixture stability.

Examples of the nonionic emulsifier (B) that can be used include: emulsifiers having an oxyethylene group, such as polyoxyethylene nonylphenyl ether, polyoxyethylene octylphenyl ether, polyoxyethylene distyrenated phenyl ether, polyoxyethylene lauryl ether, polyoxyethylene oleyl ether, polyoxyethylene stearyl ether, and polyoxyethylene sorbitol tetraoleate; and emulsifiers having an oxyethylene group and an oxypropylene group, such as a polyoxyethylene-polyoxypropylene copolymer. These nonionic emulsifiers may be used alone or in combination of two or more.

From the viewpoints of achieving more excellent texture and liquid mixture stability, among these nonionic emulsifiers, emulsifiers having an oxyethylene group and an oxypropylene group. The average number of moles of the oxyethylene group added is preferably within a range of 5 to 100, and more preferably within a range of 10 to 50. The average number of moles of the oxypropylene group added is preferably within a range of 5 to 50, and more preferably within a range of 10 to 40.

The cloudy point of the nonionic emulsifier (B) is preferably within a range of 40° C. to 80° C., and more preferably within a range of 50° C. to 80° C., because, with keeping excellent liquid mixture stability, the nonionic emulsifier (B) is sharply coagulated by heating, whereby softer texture can be achieved. Note that the cloudy point of the nonionic emulsifier (B) is determined in accordance with the following method, based on a textbook, Takehiko Fujimoto, "Shin Kaimen Kasseizai Nyumon (New Introduction to Surfactants)" Sanyo Chemical Industries, Ltd., 1992. That is, 5% by mass of an aqueous solution of the nonionic emulsifier is held at a fixed temperature for 30 minutes, and whether the nonionic emulsifier becomes insolubilized in the solution is observed. A point in temperature at which the nonionic emulsifier starts to be insolubilized with an increase in temperature is defined as the cloudy point.

From the viewpoints of achieving more excellent texture and liquid mixture stability, the amount of the nonionic emulsifier (B) mixed-in is preferably within a range of 0.1% by mass to 10% by mass, and more preferably 1% by mass to 6% by mass, with respect to 100 parts by mass of the urethane resin (A) (solid content).

Examples of the water (C) that can be used include ion-exchanged water and distilled water. These types of water may be used alone or in combination of two or more. The content of the water (C) in the urethane resin composition is, for example, within a range of 30% by mass to 90% by mass.

The urethane resin composition according to the present invention includes the urethane resin (A), the nonionic emulsifier (B), and the water (C), as essential components, and may further include other additives, if necessary.

Examples of the other additives that can be used include a coagulant, a urethanizing catalyst, a neutralizer, a silane coupling agent, a thickener, a filler, a thixotropy-imparting agent, a tackifier, a wax, a heat stabilizer, a light stabilizer, a fluorescent brightening agent, a foaming agent, a pigment, a dye, an electrical conductivity-imparting agent, an antistatic agent, a moisture permeability improver, a water repellent, an oil repellent, a hollow foam, a flame retardant, a desiccant, a moisture absorbent, a deodorant, a foam stabilizer, an anti-blocking agent, and an antihydrolysis agent. These additives may be used alone or in a combination of two or more.

As described above, the urethane resin composition according to the present invention includes water, and furthermore is produced using a biomass-derived raw material, and thus the urethane resin composition is an environment-responsive material. Furthermore, the urethane resin composition is excellent in oleic acid resistance, texture, and liquid mixture stability. Hence, the urethane resin composition can be particularly suitably used as a resin for the impregnation of fibrous substrates.

Next, a leather sheet according to the present invention will be described.

The leather sheet is such that a coagulated product of the urethane resin composition is present in a fibrous substrate.

Examples of the fibrous substrate that can be used include fibrous substrates, such as nonwoven fabrics, woven fabrics, and knitted fabrics, each made of polyester fibers, polyethylene fibers, nylon fibers, acrylic fibers, polyurethane fibers, acetate fibers, rayon fibers, polylactic acid fibers, cotton, hemp, silk, wool, glass fibers, carbon fibers, or fiber mixtures thereof.

Examples of a method for producing the leather sheet include a method in which the fibrous substrate is impregnated with the urethane resin composition and subsequently the urethane resin is coagulated.

Examples of a method of impregnating the fibrous substrate with the water dispersion of the urethane resin includes a method in which the fibrous substrate is directly immersed in a tank storing the water dispersion of the urethane resin, and then squeezed using a mangle or the like.

Next, examples of a method of coagulating the urethane resin (A) include: a thermal coagulating method in which the fibrous substrate impregnated with the urethane resin is heated at 50° C. to 130° C.; and a method in which a treatment using a saturated vapor having a temperature of 100° C. or higher (0 MPa to 0.6 MPa) or using a superheated steam having a temperature of 160° C. to 190° C. is performed. After that, drying may be applied at a temperature of 80° C. to 180° C., if necessary.

The leather sheet can be used for, for example, shoes, bags, clothes, parts of furniture such as chairs and sofas, automobile interior materials such as car seats and steering wheels, moisture permeable waterproof materials, artificial leather, abrasives, and core materials for felt-tip pens.

On the leather sheet, an intermediate layer, a bonding layer, a skin layer, a surface-treated layer, and the like may be laminated, if necessary.

EXAMPLES

Hereinafter, the present invention will be described in more detail by way of Examples.

Example 1

A four-neck flask equipped with a stirrer, a reflux condenser, a thermometer, and a nitrogen gas introduction tube was charged, under a nitrogen flow, with 400 parts by mass of biomass-derived polycarbonate polyol ("BENEBiOL NL-3010DB", manufactured by Mitsubishi Chemical Corporation, produced using 1,4-butanediol and biomass-derived 1,10-decanediol as raw materials, number average molecular weight: 3,000, hereinafter abbreviated as "Bio-PC (1)"), 6.2 parts by mass of dimethylolpropionic acid (hereinafter abbreviated as "DMPA"), 32 parts by mass of polyoxyethylene polyoxypropylene glycol (number average molecular weight: 1,750, EO/PO=50/50, hereinafter abbreviated as "EOPO (1)"), and 516 parts by mass of methyl ethyl ketone, and these were uniformly mixed. After that, 78 parts by mass of dicyclohexylmethane diisocyanate (hereinafter abbreviated as "H12MDI") was added to the mixture, and then 0.1 part by mass of bismuth octoate was added thereto. The resultant mixture was allowed to react at 70° C. for approximately 1 hour, whereby a methyl ethyl ketone solution of a urethane polymer was obtained. Subsequently, 5 parts by mass of triethylamine and 16 parts by mass of an emulsifier of polyoxyethylene polyoxypropylene glycol (the average number of moles of the oxyethylene group added: 25, the average number of moles of the oxypropylene group added: 30, cloudy point: 58° C., hereinafter abbreviated as "EOPO emulsifier (1)") were added to the methyl ethyl ketone solution of the urethane polymer obtained by the above-described method, and mixed. After that, 797 parts by mass of ion-exchanged water was added to the resultant mixture, and 15 parts by mass of isophoronediamine was added thereto, then, methyl ethyl ketone was removed therefrom by evaporation under reduced pressure, whereby a urethane resin composition (X-1) including a urethane resin (A-1) (the acid value of the urethane resin (A-1): 5 mgKOH/g, weight-average molecular weight: 280,000) was obtained.

Example 2

A four-neck flask equipped with a stirrer, a reflux condenser, a thermometer, and a nitrogen gas introduction tube was charged, under a nitrogen flow, with 400 parts by mass of biomass-derived polycarbonate polyol ("BENEBiOL NL-3030DB", manufactured by Mitsubishi Chemical Corporation, produced using 1,4-butanediol and biomass-derived 1,10-decanediol as raw materials, number average molecular weight: 3,000, hereinafter abbreviated as "Bio-PC (2)"), 6.2 parts by mass of DMPA, 32 parts by mass of the EOPO (1), and 516 parts by mass of methyl ethyl ketone, and these were uniformly mixed. After that, 78 parts by mass of H12MDI was added to the mixture, and then 0.1 part by mass of bismuth octoate was added thereto. The resultant mixture was allowed to react at 70° C. for approximately 1 hour, whereby a methyl ethyl ketone solution of a urethane polymer was obtained. Subsequently, 5 parts by mass of triethylamine and 16 parts by mass of the EOPO emulsifier (1) were added to the methyl ethyl ketone solution of the urethane polymer obtained by the above-described method, and mixed. After that, 797 parts by mass of ion-exchanged water was added to the resultant mixture, and 15 parts by mass of isophoronediamine was added thereto, then, methyl ethyl ketone was removed therefrom by evaporation under reduced pressure, whereby a urethane resin composition (X-2) including a urethane resin (A-2) (the acid value of the urethane resin (A-2): 5 mgKOH/g, weight-average molecular weight: 310,000) was obtained.

Example 3

A four-neck flask equipped with a stirrer, a reflux condenser, a thermometer, and a nitrogen gas introduction tube was charged, under a nitrogen flow, with 400 parts by mass of the Bio-PC (1), 6.2 parts by mass of DMPA, 32 parts by mass of polyoxyethylene polyoxypropylene glycol (number average molecular weight: 1,400, EO/PO=75/25, hereinafter abbreviated as "EOPO (2)"), and 518 parts by mass of methyl ethyl ketone, and these were uniformly mixed. After that, 80 parts by mass of H12MDI was added to the mixture, and then 0.1 part by mass of bismuth octoate was added thereto. The resultant mixture was allowed to react at 70° C. for approximately 1 hour, whereby a methyl ethyl ketone solution of a urethane polymer was obtained. Subsequently, 5 parts by mass of triethylamine and 16 parts by mass of the EOPO emulsifier (1) were added to the methyl ethyl ketone solution of the urethane polymer obtained by the above-described method, and mixed. After that, 788 parts by mass of ion-exchanged water was added to the resultant mixture, and 7.8 parts by mass of piperazine was added thereto, then, methyl ethyl ketone was removed therefrom by evaporation under reduced pressure, whereby a urethane resin composition (X-3) including a urethane resin (A-3) (the acid value of the urethane resin (A-3): 5 mgKOH/g, weight-average molecular weight: 280,000) was obtained.

Example 4

A four-neck flask equipped with a stirrer, a reflux condenser, a thermometer, and a nitrogen gas introduction tube was charged, under a nitrogen flow, with 400 parts by mass of the Bio-PC (1), 6.2 parts by mass of DMPA, 32 parts by mass of polyoxyethylene polyoxypropylene glycol (number average molecular weight: 3,000, EO/PO=75/25, hereinafter abbreviated as "EOPO (3)"), and 790 parts by mass of methyl ethyl ketone, and these were uniformly mixed. After that, 75 parts by mass of H12MDI was added to the mixture, and then 0.1 part by mass of bismuth octoate was added thereto. The resultant mixture was allowed to react at 70° C. for approximately 1 hour, whereby a methyl ethyl ketone solution of a urethane polymer was obtained. Subsequently, 5 parts by mass of triethylamine and 15 parts by mass of the EOPO emulsifier (1) were added to the methyl ethyl ketone solution of the urethane polymer obtained by the above-described method, and mixed. After that, 790 parts by mass of ion-exchanged water was added to the resultant mixture, and 15 parts by mass of isophoronediamine was added thereto, then, methyl ethyl ketone was removed therefrom by evaporation under reduced pressure, whereby a urethane resin composition (X-4) including a urethane resin (A-4) (the acid value of the urethane resin (A-4): 5 mgKOH/g, weight-average molecular weight: 260,000) was obtained.

Example 5

A four-neck flask equipped with a stirrer, a reflux condenser, a thermometer, and a nitrogen gas introduction tube was charged, under a nitrogen flow, with 400 parts by mass of the Bio-PC (1), 6.2 parts by mass of DMPA, 32 parts by mass of the EOPO (1), and 516 parts by mass of methyl ethyl ketone, and these were uniformly mixed. After that, 78 parts by mass of H12MDI was added to the mixture, and then 0.1 part by mass of bismuth octoate was added thereto. The resultant mixture was allowed to react at 70° C. for approximately 1 hour, whereby a methyl ethyl ketone solution of a urethane polymer was obtained. Subsequently, 5 parts by mass of triethylamine and 16 parts by mass of an emulsifier of polyoxyethylene polyoxypropylene glycol (the average number of moles of the oxyethylene group added: 20, the average number of moles of the oxypropylene group added: 20, cloudy point: 70° C., hereinafter abbreviated as "EOPO emulsifier (2)") were added to the methyl ethyl ketone solution of the urethane polymer obtained by the above-described method, and mixed. After that, 797 parts by mass of ion-exchanged water was added to the resultant mixture, and 15 parts by mass of isophoronediamine was added thereto, then, methyl ethyl ketone was removed therefrom by evaporation under reduced pressure, whereby a urethane resin composition (X-5) including a urethane resin (A-5) (the acid value of the urethane resin (A-5): 5 mgKOH/g, weight-average molecular weight: 240,000) was obtained.

Example 6

A four-neck flask equipped with a stirrer, a reflux condenser, a thermometer, and a nitrogen gas introduction tube was charged, under a nitrogen flow, with 400 parts by mass of the Bio-PC (1), 6.2 parts by mass of DMPA, 32 parts by mass of the EOPO (1), and 510 parts by mass of methyl ethyl ketone, and these were uniformly mixed. After that, 39 parts by mass of H12MDI and 33 parts by mass of isophorone diisocyanate (hereinafter abbreviated as "IPDI") were added to the mixture, and then 0.1 part by mass of bismuth octoate was added thereto. The resultant mixture was allowed to react at 70° C. for approximately 1 hour, whereby a methyl ethyl ketone solution of a urethane polymer was obtained. Subsequently, 5 parts by mass of triethylamine and 16 parts by mass of the EOPO emulsifier (1) were added to the methyl ethyl ketone solution of the urethane polymer obtained by the above-described method, and mixed. After that, 788 parts by mass of ion-exchanged water was added to the resultant mixture, and 15 parts by mass of isophoronediamine was added thereto, then, methyl ethyl ketone was removed therefrom by evaporation under reduced pressure, whereby a urethane resin composition (X-6) including a urethane resin (A-6) (the acid value of the urethane resin (A-6): 5 mgKOH/g, weight-average molecular weight: 250,000) was obtained.

Comparative Example 1

A urethane resin composition (XR-1) including a urethane resin (AR-1) was obtained in the same manner as in Example 1, except that polycarbonate polyol that is a solid at room temperature ("ETERNACOLL UH-200", manufactured by Ube Industries, Ltd., number average molecular weight: 2,000, hereinafter abbreviated as "Non-Bio-PC") was used in place of the Bio-PC (1) in Example 1.

Comparative Example 2

A four-neck flask equipped with a stirrer, a reflux condenser, a thermometer, and a nitrogen gas introduction tube was charged, under a nitrogen flow, with 400 parts by mass of the Bio-PC (1), 32 parts by mass of the EOPO (1), and 492 parts by mass of methyl ethyl ketone, and these were uniformly mixed. After that, 60 parts by mass of H12MDI was added to the mixture, and then 0.1 part by mass of bismuth octoate was added thereto. The resultant mixture was allowed to react at 70° C. for approximately 1 hour, whereby a methyl ethyl ketone solution of a urethane polymer was obtained. Subsequently, 16 parts by mass of the EOPO emulsifier (1) was added to the methyl ethyl ketone solution of the urethane polymer obtained by the above-described method, and mixed. After that, 755 parts by mass of ion-exchanged water was added to the resultant mixture, and 12 parts by mass of isophoronediamine was added thereto, then, methyl ethyl ketone was removed therefrom by evaporation under reduced pressure, whereby a urethane resin composition (XR-2) including a urethane resin (AR-2) (the acid value of the urethane resin (AR-2): 0 mgKOH/g, weight-average molecular weight: 270,000) was obtained.

Comparative Example 3

A four-neck flask equipped with a stirrer, a reflux condenser, a thermometer, and a nitrogen gas introduction tube was charged, under a nitrogen flow, with 400 parts by mass of the Bio-PC (1), 6.2 parts by mass of DMPA, and 477 parts by mass of methyl ethyl ketone, and these were uniformly mixed. After that, 71 parts by mass of H12MDI was added to the mixture, and then 0.1 part by mass of bismuth octoate was added thereto. The resultant mixture was allowed to react at 70° C. for approximately 1 hour, whereby a methyl ethyl ketone solution of a urethane polymer was obtained. Subsequently, 5 parts by mass of triethylamine and 16 parts by mass of the EOPO emulsifier (1) were added to the methyl ethyl ketone solution of the urethane polymer obtained by the above-described method, and mixed. After that, 736 parts by mass of ion-exchanged water was added to the resultant mixture, and 14 parts by mass of isophoronediamine was added thereto, then, methyl ethyl ketone was removed therefrom by evaporation under reduced pressure, whereby a urethane resin composition (XR-3) including a urethane resin (AR-3) (the acid value of the urethane resin (AR-3): 5 mgKOH/g, weight-average molecular weight: 250,000) was obtained.

Comparative Example 4

A urethane resin composition (XR-4) including a urethane resin (AR-4) was obtained in the same manner as in Example 1, except that the EOPO emulsifier (1) in Example 1 was not used.

[Method for Measuring Number Average Molecular Weight and Weight-Average Molecular Weight]

The number average molecular weight of each of the polyols and the weight-average molecular weight of each of the urethane resins that are used in Examples and Comparative Examples are values determined by GPC under the following conditions.

Measurement Device: High performance GPC ("HLC-8220GPC", manufactured by Tosoh Corporation)

Columns: The following columns manufactured by Tosoh Corporation were connected in series and used.

"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1

Detector: RI (differential refractometer)
Column Temperature: 40° C.
Eluent: tetrahydrofuran (THF)
Flow Rate: 1.0 mL/minute
Injection Amount: 100 μL (a tetrahydrofuran solution having a sample concentration of 0.4% by mass)

Standard samples: The following types of standard polystyrene were used to produce a calibration curve.

(Standard Polystyrene)
"TSKgel standard polystyrene A-500", manufactured by Tosoh Corporation
"TSKgel standard polystyrene A-1000", manufactured by Tosoh Corporation
"TSKgel standard polystyrene A-2500", manufactured by Tosoh Corporation
"TSKgel standard polystyrene A-5000", manufactured by Tosoh Corporation
"TSKgel standard polystyrene F-1", manufactured by Tosoh Corporation
"TSKgel standard polystyrene F-2", manufactured by Tosoh Corporation
"TSKgel standard polystyrene F-4", manufactured by Tosoh Corporation
"TSKgel standard polystyrene F-10", manufactured by Tosoh Corporation
"TSKgel standard polystyrene F-20", manufactured by Tosoh Corporation
"TSKgel standard polystyrene F-40", manufactured by Tosoh Corporation
"TSKgel standard polystyrene F-80", manufactured by Tosoh Corporation
"TSKgel standard polystyrene F-128", manufactured by Tosoh Corporation
"TSKgel standard polystyrene F-288", manufactured by Tosoh Corporation
"TSKgel standard polystyrene F-550", manufactured by Tosoh Corporation

[Method for Measuring Acid Value of Urethane Resin (A)]

Each of the urethane resin compositions obtained in the Examples and Comparative Syntheses-Examples was dried, and 0.05 g to 0.5 g of the dried and solidified resin particles were weighed into a 300-mL Erlenmeyer flask. Subsequently, approximately 80 mL of a solvent mixture of tetrahydrofuran and ion-exchanged water at a mass ratio [tetrahydrofuran/ion-exchanged water] of 80/20 was added, whereby a mixed solution thereof was obtained.

Next, a phenolphthalein indicator was mixed with the solution mixture. Then, the resultant mixture was titrated with a 0.1-mol/L aqueous potassium hydroxide solution standardized in advance. The acid value (mgKOH/g) of the anionic urethane resin (X) was determined according to the following calculation formula (1) by using the amount of the aqueous potassium hydroxide solution used for the titration.

$$\text{Calculation formula } A=(B \times f \times 5.611)/S \quad (1)$$

In formula (1), A is the acid value (mgKOH/g) of the solid content of the resin; B is the amount (mL) of the 0.1-mol/L aqueous potassium hydroxide solution used for the titration; f is the factor of the 0.1-mol/L aqueous potassium hydroxide solution; S is the mass (g) of the resin particles: and 5.611 is the formula weight of potassium hydroxide (56.11/10).

[Evaluation Method for Liquid Mixture Stability]

Each of the urethane resin compositions obtained in Examples and Comparative Examples was diluted with water to achieve a solid content of 20% by mass, and 1 part by mass of sodium chloride was added with respect to 100 parts by mass of the resultant mixture to obtain a liquid mixture. The obtained liquid mixture was left standing in an atmosphere with a temperature of 40° C. for 1 week and evaluated according to the following criteria.

"A": No change in appearance.
"B": Precipitate was observed in small amounts.
"C": Precipitate was observed in large amounts.

[Method for Preparing Impregnated Nonwoven Fabric]

Each of the urethane resin compositions obtained in Examples and Comparative Examples was diluted with water to achieve a solid content of 20% by mass, and 1 part by mass of sodium chloride was added with respect to 100 parts by mass of the resultant mixture to obtain a liquid mixture. A nonwoven fabric formed from 200 g/m$^2$ of polyester fiber was impregnated with the obtained liquid mixture, and squeezed using a mangle to achieve 100% pickup. Subsequently, the nonwoven fabric was left standing in a saturated steam having a temperature of 100° C. for 2 minutes, and dried by a dryer at 100° C. for 20 minutes, whereby an impregnated nonwoven fabric (leather sheet) was prepared.

[Evaluation Method for Oleic Acid Resistance]

The obtained impregnated nonwoven fabric was left standing in a state of being immersed in oleic acid at a temperature of 80° C. overnight, and visually evaluated according to the following criteria.

"A": No change in appearance.
"B": Slight swelling occurred.
"C": Large swelling occurred.

[Evaluation Method for Texture]

The obtained impregnated nonwoven fabric was evaluated by the tactile impression according to the following criteria.

"A": Soft and excellent flexibility
"B": Slight flexibility
"C": Poor flexibility

[Evaluation Method for Light Resistance]

Using a xenon fadeometer, the obtained impregnated nonwoven fabric was irradiated with light of 110 MJ under the conditions of a temperature of 89° C. and a humidity of 50%, and visually evaluated according to the following criteria.

"A": No change in appearance.
"B": Slight yellowing occurred.
"C": Significant yellowing occurred.

TABLE 1

|  |  | Example 1 | Example 2 | Example 3 | Example 4 |
| --- | --- | --- | --- | --- | --- |
| Urethane resin (A) | Raw material | Bio-PC (1) DMPA EOPO (1) H12MDI | Bio-PC (2) DMPA EOPO (1) H12MDI | Bio-PC (1) DMPA EOPO (2) H12MDI | Bio-PC (1) DMPA EOPO (3) H12MDI |
| Nonionic emulsifier (B) |  | EOPO emulsifier (1) | EOPO emulsifier (1) | EOPO emulsifier (1) | EOPO emulsifier (1) |
| Liquid mixture stability |  | A | A | A | A |
| Texture |  | A | A | A | A |
| Light resistance |  | A | A | A | A |
| Oleic resistance |  | A | A | A | A |

TABLE 2

|  |  | Example 5 | Example 6 | Comparative example 1 | Comparative example 2 |
| --- | --- | --- | --- | --- | --- |
| Urethane resin (A) | Raw material | Bio-PC (1) DMPA EOPO (1) H12MDI | Bio-PC (1) DMPA EOPO (1) H12MDI IPDI | Non-bio-PC DMPA EOPO (1) H12MDI | Bio-PC (1) EOPO (1) H12MDI |
| Nonionic emulsifier (B) |  | EOPO emulsifier (2) | EOPO emulsifier (1) | EOPO emulsifier (1) | EOPO emulsifier (1) |
| Liquid mixture stability |  | A | A | B | C |
| Texture |  | A | A | C | A |
| Light resistance |  | A | A | A | A |
| Oleic resistance |  | A | A | C | A |

TABLE 3

|  |  | Comparative example 3 | Comparative example 4 |
| --- | --- | --- | --- |
| Urethane resin (A) | Raw material | Bio-PC (1) DMPA H12MDI | Bio-PC (1) DMPA EOPO (1) H12MDI |
| Nonionic emulsifier (B) |  | EOPO emulsifier (1) | — |
| Liquid mixture stability |  | C | C |
| Texture |  | C | C |
| Light resistance |  | A | A |
| Oleic resistance |  | A | A |

It was found that Examples 1 to 6, each being the urethane resin composition according to the present invention, were excellent in liquid mixture stability, texture, light resistance, and oleic acid resistance.

In contrast, Comparative Example 1, as an aspect using non-biomass polycarbonate polyol in place of the polycarbonate polyol (a1), was poor in texture and oleic acid resistance.

Comparative Example 2, as an aspect using a urethane resin not having an anionic group, was poor in liquid mixture stability.

Comparative Example 3, as an aspect using a urethane resin not having a nonionic group, was poor in texture and liquid mixture stability.

Comparative Example 5, as an aspect not using the nonionic emulsifier (B), was poor in texture and liquid mixture stability.

The invention claimed is:

1. A urethane resin composition, comprising:
    a urethane resin (A) having an anionic group and a nonionic group and produced using as a raw material a polycarbonate polyol (a1) produced using biomass-derived decanediol as a raw material;
    a nonionic emulsifier (B); and
    water (C).

2. The urethane resin composition according to claim 1, wherein the nonionic emulsifier (B) has an oxyethylene group and an oxypropylene group.

3. The urethane resin composition according to claim 1, wherein the polycarbonate polyol (a1) is produced further using butanediol as a raw material.

4. The urethane resin composition according to claim 3, wherein a molar ratio [(C4)/(C10)] of the butanediol (C4) to the biomass-derived decanediol (C10) in the polycarbonate polyol (a1) is within a range of 5/95 to 95/5.

5. The urethane resin composition according to claim 1, wherein the nonionic group in the urethane resin (A) includes an oxyethylene group and an oxypropylene group.

6. The urethane resin composition according to claim 5, wherein the oxyethylene group and the oxypropylene group are supplied from a polyol having an oxyethylene group and an oxypropylene group.

7. A leather sheet, comprising a coagulated product of the urethane resin composition according to claim 1 present in a fibrous substrate.

* * * * *